United States Patent
Filsfils

(10) Patent No.: US 7,590,152 B1
(45) Date of Patent: Sep. 15, 2009

(54) ROUTER-BASED MONITORING OF EF-ON-EF JITTER

(75) Inventor: Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 11/188,357

(22) Filed: Jul. 25, 2005

(51) Int. Cl.
H04J 3/06 (2006.01)

(52) U.S. Cl. .................. 370/516; 370/412; 370/428; 370/429; 370/464; 370/498; 370/503; 370/517; 370/235; 702/1; 702/57; 702/66; 702/69; 375/224; 375/226; 375/372; 710/52; 710/53; 710/54; 710/55; 710/56

(58) Field of Classification Search .......... 702/1, 702/57, 66, 69; 370/464, 498, 503, 516, 370/428, 429, 412, 517, 235; 375/224, 226, 375/372; 710/52–56

See application file for complete search history.

(56) References Cited

U.S. PATENT DOCUMENTS

| | | | |
|---|---|---|---|
| 6,631,446 B1 * | 10/2003 | Cherkauer et al. .......... 711/134 |
| 6,651,101 B1 | 11/2003 | Gai et al. | |
| 6,707,821 B1 | 3/2004 | Shaffer et al. | |
| 6,813,243 B1 | 11/2004 | Epps et al. | |
| 6,822,940 B1 | 11/2004 | Zavalkovsky et al. | |
| 6,839,327 B1 | 1/2005 | Zavalkovsky et al. | |
| 6,868,068 B1 | 3/2005 | Jain et al. | |
| 6,868,094 B1 | 3/2005 | Bordonaro et al. | |
| 6,885,642 B1 | 4/2005 | Jain et al. | |
| 6,904,014 B1 | 6/2005 | Gai et al. | |
| 6,912,203 B1 | 6/2005 | Jain et al. | |
| 7,304,942 B1 * | 12/2007 | Malladi et al. .............. 370/229 |
| 2002/0167911 A1 * | 11/2002 | Hickey ....................... 370/252 |
| 2004/0158646 A1 | 8/2004 | Miernik et al. | |
| 2005/0123003 A1 | 6/2005 | Bordonaro et al. | |

OTHER PUBLICATIONS

Jacobson, V., et al., RFC 2598, entitled An Expedited Forwarding PHB, Jun. 1999, pp. 1-11.

* cited by examiner

Primary Examiner—William Trost, IV
Assistant Examiner—Kyle C Kasparek
(74) Attorney, Agent, or Firm—Cesari and McKenna LLP

(57) ABSTRACT

A system for monitoring EF-on-EF jitter in a network node having an EP output queue into which EF packets are entered comprises a first counter that counts the packets entering the queue and also a second counter that counts the packets entering the queue when the queue depth is greater than an operator-determined maximum depth, whereby the operator can compare the two counts to determine the proportion of packets that might be subject to jitter corresponding to the maximum depth. Preferably, the system also includes a third counter that counts the number of packets entering the queue when the queue depth exceeds an alarm depth greater than the maximum depth.

15 Claims, 2 Drawing Sheets

ROUTER-BASED MONITORING OF EF-ON-EF JITTER

BACKGROUND OF THE INVENTION

1. Field of the Invention

This invention relates to the monitoring of jitter in a data stream passing through a network router or switch configured to provide expedited forwarding (EF) of the data stream. More particularly, it relates to the use of the depths of an output queue at enqueue times to ascertain the worst-case jitter characteristics of data streams passing through the queue.

2. Background Information

In data networks, nodes such as routers and switches may be equipped to provide differential services for different classes of traffic. Specifically, they may operate to apply per-hop behaviors (PHB's) for forwarding designated classes of data packets to downstream nodes. One of these PHB's, termed "Expedited Forwarding" (EF) is used, for example, to provide a virtual wired connection between the endpoints of traffic having this designation.

Expedited Forwarding is thus a premium service that commands relatively high revenues from those who have requested it. However it requires the ability of the network nodes between the endpoints to pass essentially interrupted data streams between the endpoints. Inevitably, there is, at least occasionally, some jitter in these transmissions. The jitter can be caused by a number of factors, one of which, "EF on EF" jitter, is the subject of the present invention. This jitter results from the use of a single output line for multiple EF packet streams: a packet burst in one stream can increase the latency in the other streams.

For example, consider a packet stream A serviced by a router, along with other streams, by the EF PHB. If, at enqueue time of packet A(n), the depth of the output queue through which the stream passes is Q(n) and at enqueue time of packet A(n+1), the EF queue depth is Q(n+1), then the per hop EF-on-EF jitter for these two consecutive packets of stream A is $[Q(n+1)-Q(n)]/EF$ service rate. As the EF is serviced with priority to any other PHB, the EF service rate is equal to the link rate of the output line. Hence the jitter between any two consecutive packets of a stream A is equal to $[Q(n+1)-Q(n)]/$link rate. It is impossible to memorize these $Q(.)$ values for all the streams mixed in an EF output queue (there could be 1000's of them at any time) and hence it is very difficult to measure the per hop EF-on-EF jitter.

The endpoints can accommodate some degree of jitter by buffering the arriving packets so as to provide a continuous output stream to a device, such as telephone processing circuitry, that processes the data in the incoming stream. However, the degree of buffering that can be applied at an end point is limited, largely by latency considerations. Thus the per-hop jitters encountered at the intermediate nodes between the endpoints must be kept below certain limits so as not to exceed the limits of endpoint buffering. This requires that the service provider monitor the jitter at each of the intermediate network nodes so that corrective action can be taken when the jitter imposed on the data stream by the node falls outside certain limits set by the service provider. There may be a number of locations in a router or switch that may manifest jitter and most of these can be is measured and dealt with by the service providers who operate these devices.

However, jitter, which may be defined as the difference in delay between consecutive data packets, is difficult to determine in practice in the Priority Queues which deliver EF packets to the lines that pass the packets to downstream devices. In such a queue jitter is the result of the fact that more than one EF data packet stream passes through the queue and changes in traffic flow in one packet stream can cause corresponding jitters in other packet streams flowing through the same queue.

SUMMARY OF THE INVENTION

The present invention makes use of the fact that the depth of a packet at enqueue time in an EF Queue directly indicates whether this packet could have a jitter compared to the previous packet of the same stream larger than a set bound. Conversely, it indicates whether for sure this packet cannot have an EF-on-EF jitter compared to its predecessor in its packet stream greater than a set value. The queue is "drained" at a constant, known rate, i.e., the link rate of the outgoing line. Thus the depth of a packet at enqueue time is a direct measure of the time interval before the packet will be transmitted. Moreover, the maximum jitter that can be ascribed to the packet is exactly that interval.

In accordance with the invention, I set a maximum bound on the EF-on-EF jitter and count any packet which could have an EF-on-EF jitter with respect to its previous packet in its own stream larger than this bound.

The word "could" is important. Indeed, the arrangement I propose is based on the following principle: the worst-case jitter between two consecutive packets of the same stream happens when the previous packet was enqueued in an empty queue and the following packet is enqueued in a full queue. If our desired worst-case EF-on-EF jitter is X μsec, we can thus translate this requirement into a queue depth, Qt, in bytes, by multiplying X by the link rate. We can then count the packets which are enqueued when the queue depth is greater Qt. These packets could have a jitter larger than or equal to X. We do not know whether in fact the jitter is equal to or greater than X. What matters is that all the other packets that were not counted are sure to have had an EF-on-EF jitter which is less than X . . . and this is what we want. Accordingly, if the service provider assigns a maximum jitter to the packets in a "virtual connection," he/she can count the number of packets entering the queue when the queue at that time has a depth greater than an operator-determined threshold and compare that count with the total number of such packets entering the queue to provide, for example, the fraction of the packets that could be involved in a jitter greater than the maximum jitter. If C1 is the number of packets enqueued in an EF queue when the queue depth was greater than the thresholds and C2 is the total number of packets that have been entered into the queue, then C1/C2 is the fraction of packets that could have an EF-on-EF jitter greater than the threshold and (C2−C1)/C2 is the fraction of packets that are certain to have an Ef-on-EF jitter less than the threshold This provides an important part of the information that the provider needs in order to monitor the service offered to EF customers and take corrective action if such is required.

The foregoing discussion is, of course, applicable when multiple EF packet streams share an EF link. This is a natural outcome of the definition of the EF PHB: EF has priority over any other PHB and hence its drain rate is assured to be the line rate, whatever the number of alternate PHB's active on the link.

BRIEF DESCRIPTION OF THE DRAWINGS

The invention description below refers to the accompanying drawing, of which.

DETAILED DESCRIPTION OF AN ILLUSTRATIVE EMBODIMENT

Figure 1:
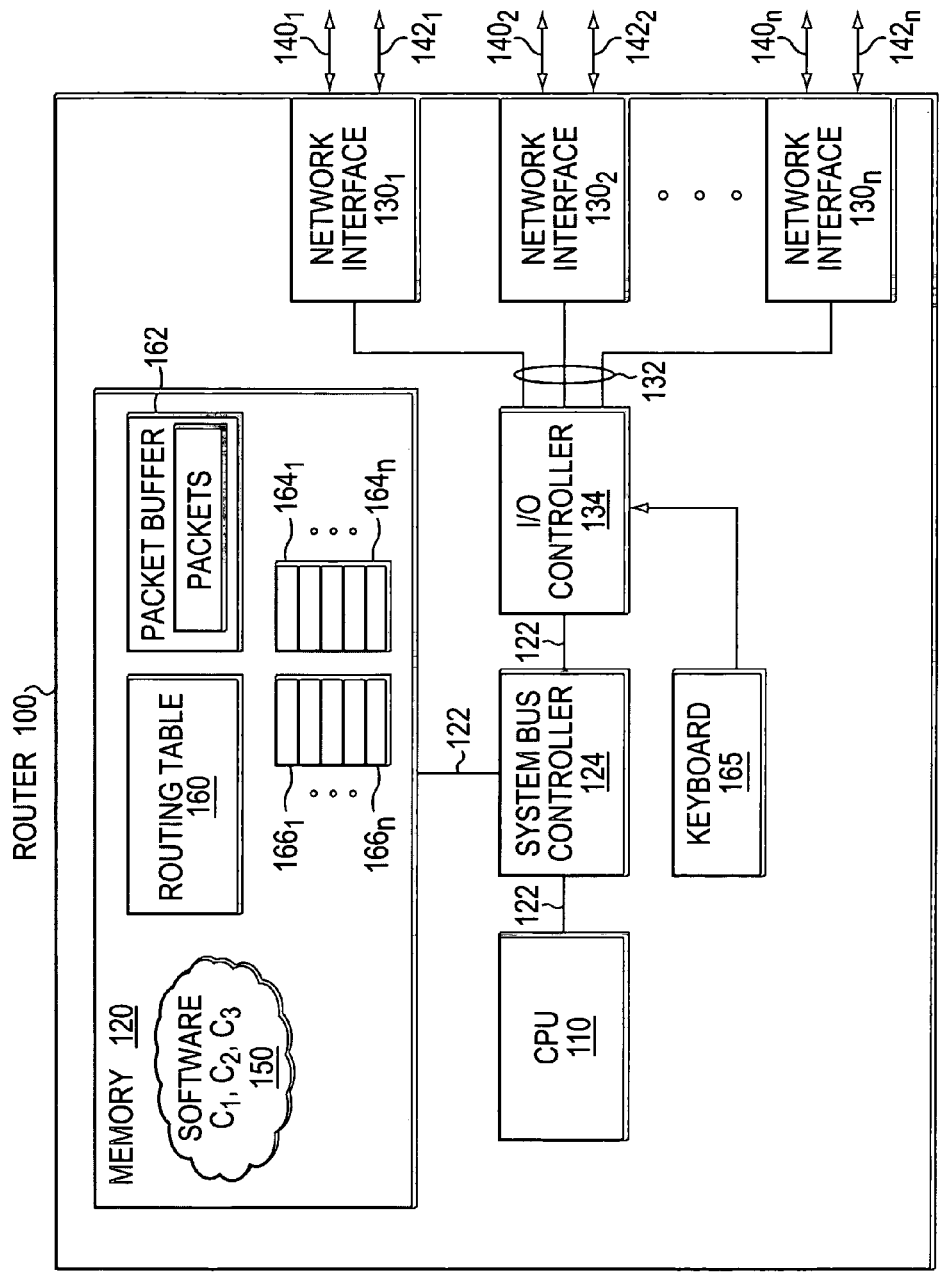
FIG. 1 is a simplified diagram of a router in which the invention may be practiced.
Figure 2:
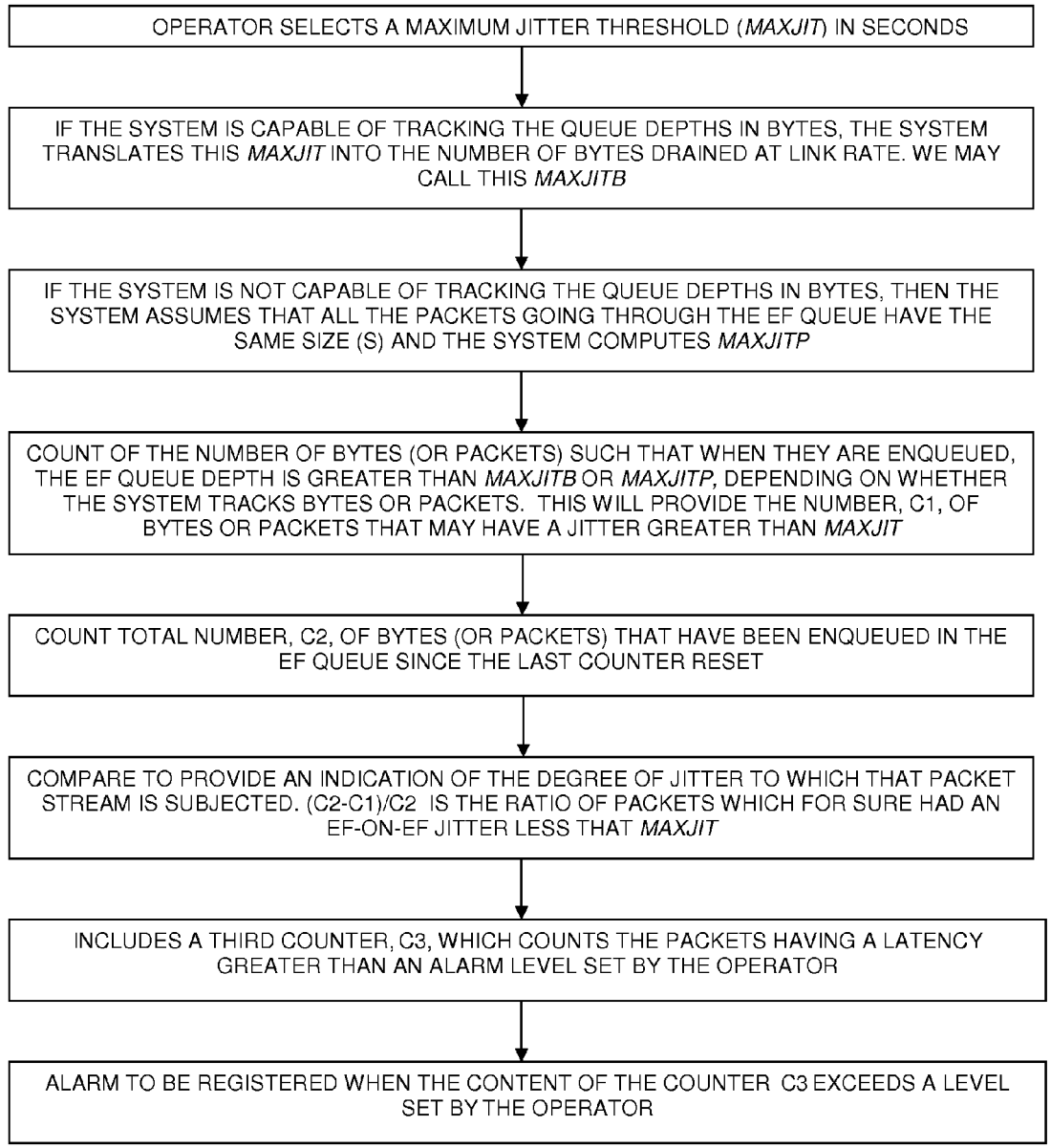
FIG. 2 is a flow diagram of a sequence of steps.

The invention may be incorporated in any conventional intermediate network node such as the router 100 depicted in FIG. 1. The router includes a CPU 110 and a memory 120, interconnected by a system bus 122 by way of a bus controller 124. The router also includes network interfaces $130_1 \ldots 130n$ connected by way of an I/O bus 132 to an I/O bus controller 134 that is connected to the system bus controller 124. The network interfaces 130 are connected to incoming lines $140_1 \ldots 140n$ and outgoing lines $142_1 \ldots 142n$.

The memory 120 includes software 150 that, in conjunction with the CPU 110, performs the various functions of the router. Among these functions are Per-Hop Behaviors including Expedited Forwarding. Also located in the memory 120 are a routing table 160, a packet buffer 162 and a set of circular output queues $164_1 \ldots 164_n$ and input queues $166_1 \ldots 166n$. The output and input queues contain pointers to packets in the packet buffer 162. Each of these queues 164 is associated with an interface 130 that has a like-numbered subscript. A keyboard 165 is included for supervisory control of the router 100.

In operation incoming data packets are passed by the interfaces 130 to the buffer 162. Pointers to these packets are entered into the input queues 166 that correspond to the respective interfaces. The router 100 processes the packets in order by examining the headers on the packets, and using the destination IP addresses to access the routing table 160 to determine the output lines to which they are to be forwarded. For each packet the router then moves the packet's pointer into the "bottom" of corresponding output queue 164. The interfaces 130, which keep track of the heads of their output queues 164, retrieve the packets from the buffer 162 by direct memory access and transmit them over the respective outgoing lines $142_1 \ldots 142_n$.

The invention relates to the use of the output queues 164 to monitor the jitter in EF packet streams in these queues.

As noted above, the presence of packets in an output queue 164 is an indication of possible jitter in the packet streams passing through the queue. Since the only transmissions on the line $142_1$, for example, are from the queue $164_1$, the drain rate of the queue is equal to the link rate of the line $142_1$. Specifically, as soon as EF PHB is used, its packets have priority over any other queue and its service rate is thus the line rate by definition.

In one embodiment of the invention, to monitor the jitter in a packet stream passing through the queue $164_1$, the operator selects a maximum jitter threshold (maxjit) in seconds.

If the system is capable of tracking the queue depths in bytes, the system translates this maxjit quantity into the number of bytes drained at link rate. We may call this maxjitB, which is computed as maxjit*r where r is the link speed in bytes per second.

If the system is not capable of tracking the queue depths in bytes, then the system assumes that all the packets going through the EF queue have the same size (S) and the system computes maxjitP (the threshold in packet counts) as maxjitP=maxjitB/S.

In either case, the system can then keep count of the number of bytes (or packets) such that when they are enqueued, the EF queue depth is greater than maxjitB or maxjitP, depending on whether the system tracks bytes or packets. This will provide the number, C1, of bytes or packets that may have a jitter greater than maxjit. This number can be compared with the total number, C2, of bytes (or packets) that have been enqueued in the EF queue since the last counter reset to provide an indication of the degree of jitter to which that packet stream is subjected. If C1 is the first counter and C2 the latter, then what the SP is interested in is (C2−C1)/C2, which is the ratio of packets which for sure had an EF-on-EF jitter less that maxjit. If this ratio is not large enough, then corrective actions will be taken.

Preferably, the unit also includes a third counter, C3, which counts the packets having a latency greater than an alarm level set by the operator, e.g. 2*maxjit. This count informs the operator of an extreme jitter possibility. If desired, the software 150 can include provisions for an alarm to be registered when the content of the counter C3 exceeds a level set by the operator.

The operator can also assign counters and alarms for additional threshold jitter possibilities. All of the counters can be reset by the operator after intervals chosen by him/her.

It will thus be seen that I have provided a method of readily calculating the jitter possibilities packets in an EF output queue subject to EF-on-EF jitter. The method is easily implemented in intermediate network nodes by including software that performs simple calculations and is included with the software that provides the usual functions of an intermediate node.

What is claimed is:

1. A method of monitoring jitter conditions in an Expedited Forwarding (EF) packet stream
    passing through an EF queue to an output link, the method comprising: setting a maximum depth of the queue; counting all the bytes or packets entering the queue;
    separately counting all the bytes or packets entering the queue when queue depth is greater than the maximum depth; and
    comparing, by a central processing unit, the count of all the bytes or packets entering the queue when the queue depth is greater than the maximum depth with the count of all the bytes or packets entering the queue, to monitor jitter conditions in the EF packet stream.

2. The method of claim 1, including the further steps of: setting an alarm depth of the queue;
    separately counting the bytes or packets entering the queue when the queue depth exceeds the alarm depth; and
    registering an alarm when the number of bytes or packets entering the queue when the queue depth exceeds the alarm depth exceeds a predetermined number in an interval of predetermined length.

3. The method of claim 1, further comprising the step of:
    dividing the count of all the bytes or packets entering the queue when the queue depth is greater than the maximum depth by the count of all the bytes or packets entering the queue, to determine a fraction of bytes or packets that could have jitter greater than a maximum jitter value.

4. The method of claim 3, wherein the jitter is EF-on-EF jitter caused by the EF packet stream sharing a link with one or more other EF packet streams.

5. The method of claim 1, further comprising the step of:
    subtracting the count of all the bytes or packets entering the queue when the queue depth is greater than the maximum depth from the count of all the bytes or packets entering the queue to produce a difference, and dividing the difference by the count of all the bytes or packets entering the queue, to determine a fraction of bytes or packets that are certain to have jitter less than a maximum jitter value.

6. The method of claim 5, wherein the jitter is EF-on-EF jitter caused by the EF packet stream sharing a link with one or more other EF packet streams.

7. The method of claim 1, further comprising the step of:
assuming that all packets entering the queue are of a same size.

8. An apparatus for monitoring jitter conditions in a packet stream, the apparatus comprising:
an output queue configured to pass the packet stream to an output link, the output queue associated with a maximum depth;
a first counter configured to count all the packets entering the output queue; and
a second counter configured to count all the packets entering the output queue when queue depth is greater than the maximum depth;
a central processing unit configured to compare the count of all the packets entering the queue when the queue depth is greater than the maximum depth with the count of all the packets entering the queue, to monitor jitter conditions in the packet stream.

9. The apparatus of claim 8 wherein the central processing unit is further configured to divide the count of all the packets entering the queue when the queue depth is greater than the maximum depth by the count of all the bytes or packets entering the queue, to determine a fraction of bytes or packets that could have jitter greater than a maximum jitter value.

10. The apparatus of claim 8, wherein the packet stream is an Expedited Forwarding (EF) packet stream.

11. The apparatus of claim 10, wherein the jitter is EF-on-EF jitter caused by the EF packet stream sharing a link with one or more other EF packet streams.

12. The apparatus of claim 8, wherein the central processing unit is further configured to subtract the count of all the packets entering the queue when the queue depth is greater than the maximum depth from the count of all the packets entering the queue, to produce a difference, and to divide the difference by the count of all the packets entering the queue, to determine a fraction of packets that are certain to have jitter less than a maximum jitter value.

13. The apparatus of claim 12, wherein the packet stream is an Expedited Forwarding (EF) packet stream, and wherein the jitter is EF-on-EF jitter.

14. The apparatus of claim 8, wherein the output queue is further associated with an alarm depth, and the apparatus further comprises:
a third counter configured to count the packets entering the queue when the queue depth exceeds the alarm depth; and
wherein the central processing unit is further configured to register an alarm when the number of packets counted when the count the packets entering the queue when the queue depth exceeds the alarm depth exceeds a particular number.

15. The apparatus of claim 14, wherein the central processing unit assumes that all packets entering the queue are of a same size.

* * * * *

UNITED STATES PATENT AND TRADEMARK OFFICE
CERTIFICATE OF CORRECTION

| | | |
|---|---|---|
| PATENT NO. | : 7,590,152 B1 | Page 1 of 1 |
| APPLICATION NO. | : 11/188357 | |
| DATED | : September 15, 2009 | |
| INVENTOR(S) | : Clarence Filsfils | |

It is certified that error appears in the above-identified patent and that said Letters Patent is hereby corrected as shown below:

Col. 1, Line 62, please amend as shown:

jitter and most of these can be[[ is]] measured and dealt with by

Col. 2, Line 47, please amend as shown:

depth was greater than the threshold[[s]] and C2 is the total

Signed and Sealed this

Twelfth Day of October, 2010

David J. Kappos
*Director of the United States Patent and Trademark Office*